US010098505B2

(12) United States Patent
Roberts et al.

(10) Patent No.: US 10,098,505 B2
(45) Date of Patent: Oct. 16, 2018

(54) DAMPER MECHANISM FOR TILT-HEAD STAND MIXER

(71) Applicant: Whirlpool Corporation, Benton Harbor, MI (US)

(72) Inventors: Erica L. Roberts, Stevensville, MI (US); Mark J. Sherman, Hudsonville, MI (US); Daniel A. Altenritter, Kalamazoo, MI (US); Steve C. Drees, Stevensville, MI (US); Stuart W. Athey, Arcanum, OH (US); Everett S. Kettle, Portage, MI (US); Arren J. McCormick, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 617 days.

(21) Appl. No.: 14/706,029

(22) Filed: May 7, 2015

(65) Prior Publication Data

US 2016/0324367 A1 Nov. 10, 2016

(51) Int. Cl.
*A47J 43/00* (2006.01)
*A47J 43/07* (2006.01)
*A47J 43/044* (2006.01)
*B01F 7/16* (2006.01)
*F16F 9/00* (2006.01)

(52) U.S. Cl.
CPC ......... *A47J 43/0705* (2013.01); *A47J 43/044* (2013.01); *B01F 7/1615* (2013.01); *F16F 9/00* (2013.01); *A47J 2043/04454* (2013.01); *A47J 2043/04481* (2013.01)

(58) Field of Classification Search
CPC ........ F16F 9/00; A47J 43/0705; A47J 43/044; A47J 2043/04454; A47J 2043/04481; B01F 7/1615
See application file for complete search history.

(56) References Cited

U.S. PATENT DOCUMENTS

| 8,336,166 | B2 * | 12/2012 | Kim | ...... E05F 5/006 16/82 |
|---|---|---|---|---|
| 2010/0313701 | A1 * | 12/2010 | Lu | ...... A47J 43/0705 74/527 |
| 2013/0068055 | A1 | 3/2013 | Blagotinsek et al. | |
| 2013/0125679 | A1 | 5/2013 | Blagotinsek et al. | |

FOREIGN PATENT DOCUMENTS

WO 2008132429 11/2008

* cited by examiner

*Primary Examiner* — Anshu Bhatia
(74) *Attorney, Agent, or Firm* — Price Heneveld LLP

(57) ABSTRACT

A damper mechanism for a stand mixer includes a swing body coupled to a pivot pin and operable along an actuation path between first and second positions. A piston damper is configured to provide a damping effect to a downward movement of a mixer head and is coupled to the swing body. The piston damper includes a damper housing and a piston rod, wherein the piston rod is operable between extended and compressed positions relative to the damper housing. The piston damper provides a damping effect along a portion of the actuation path of the swing body as a mixer head moves towards the closed position relative to a pedestal of the stand mixer.

14 Claims, 7 Drawing Sheets

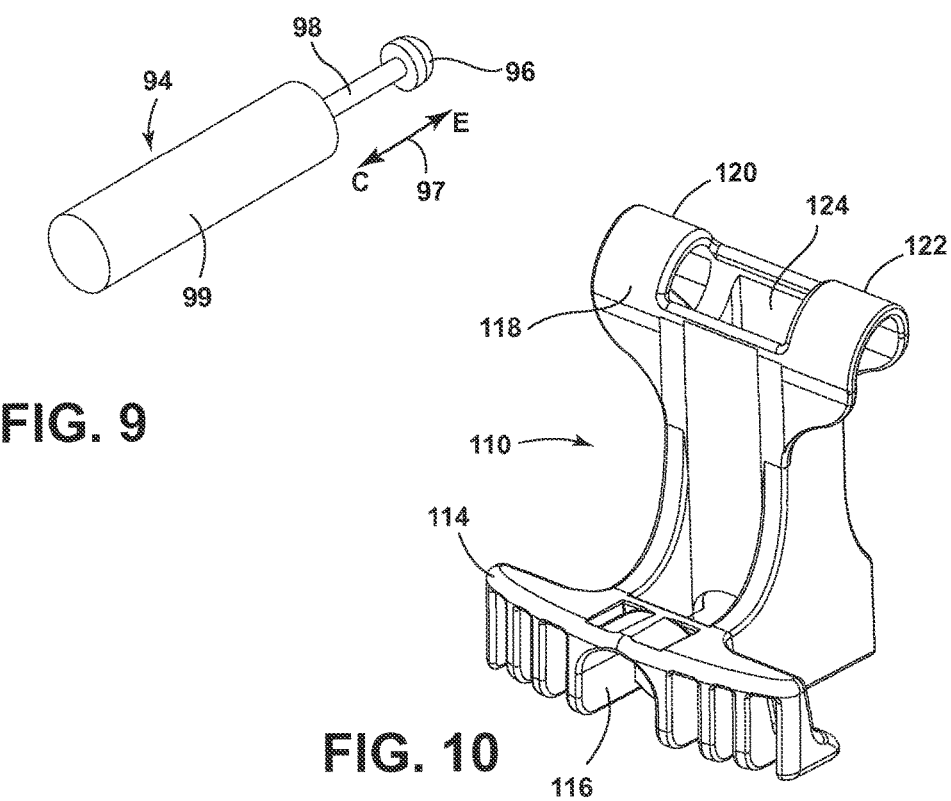
FIG. 9
FIG. 10
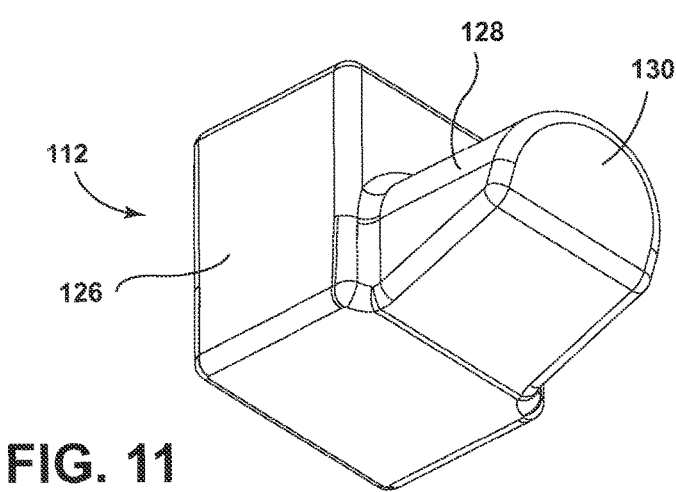
FIG. 11

DAMPER MECHANISM FOR TILT-HEAD STAND MIXER

FIELD

The present concept relates to a damper mechanism for use with a stand mixer, and more particularly, to a damper mechanism configured to dampen a closing movement of a mixer head in a tilt-head stand mixer.

BACKGROUND

Stand mixers are known in the art and have been adapted to provide a broad range of food processing functions. A tilt-head stand mixer generally includes an articulating mixer head which pivots between open and closed positions relative to a pedestal. Such mixer heads are known to be a relatively heavy component of a stand mixer as they often include cast metal parts and house several heavy components, such as motors, transmissions, planetary drives, motor controls, locking mechanism, and other such features of the stand mixer. Given the weight of the mixer head, the movement of the mixer head from the open position towards the closed position can be sudden, loud and jarring, particularly, if the mixer head is allowed to free-fall from the open position downwards towards the closed position. Damper mechanisms have been included in stand mixers to help dampen this downward movement, however, a number of these damper mechanisms are complicated and often allow for recoil or rebound of the mixer head when the mixer head is moved to the closed position, and unnecessarily dampen the full range of motion of the mixer head. Thus, a controlled and dampened movement of a portion of the actuation path of the mixer head from the open position to the closed position is desired in a manner that does not produce any rebound or recoil and is consistent in its delivery of a damping effect.

SUMMARY

One aspect of the present disclosure includes a damper mechanism for a stand mixer, wherein the stand mixer includes a mixer head and a pedestal. The mixer head is pivotally coupled to the pedestal via a pivot pin between open and closed positions relative to the pedestal. The damper mechanism includes a swing body coupled to the pivot pin and operable along an actuation path between first and second positions. A piston damper is configured to provide a damping effect to a downward movement of the mixer head and is coupled to the swing body. The piston damper includes a damper housing and a piston rod, wherein the piston rod is operable between extended and compressed positions relative to the damper housing. The piston damper provides the damping effect along a portion of the actuation path of the swing body as the mixer head moves towards the closed position.

Another aspect of the present disclosure includes a damper mechanism for a stand mixer, wherein the stand mixer includes a mixer head and a pedestal. The mixer head is pivotally coupled to the pedestal between open and closed positions. The damper mechanism comprising includes a swing body operably coupled between the mixer head and the pedestal, wherein the swing body is operable along an actuation path between first and second positions as the mixer head moves between the open position to the closed position, respectively. A piston damper is coupled to the swing body and operable between extended and compressed positions. The piston damper is in the extended position when the mixer head is in the open position and the piston damper is in the compressed position when the mixer head is in the closed position. Thus, the piston damper moves from the extended position to the compressed position as the mixer head moves from the open position to the closed position to dampen a portion of a downward movement of the mixer head.

Yet, another aspect of the present disclosure includes a stand mixer having a pedestal which includes a pedestal cavity. A mixer head is pivotally coupled to the pedestal, such that the mixer head moves from an open position to an angled position to a closed position in a downward motion. A damper mechanism is disposed in the pedestal cavity of the pedestal and is further coupled to a portion of the mixer head. The damper mechanism configured to dampen a portion of the downward motion of the mixer head as the mixer head moves to the closed position from the open position.

These and other features, advantages, and objects of the present device will be further understood and appreciated by those skilled in the art by reference to the following specification, claims, and appended drawings.

BRIEF DESCRIPTION OF THE DRAWINGS

In the drawings:

FIG. 9 is a rear perspective view of a piston damper;

FIG. 10 is a front perspective view of a swing body; and

FIG. 11 is a front perspective view of a bumper assembly.

DETAILED DESCRIPTION

Figure 1:
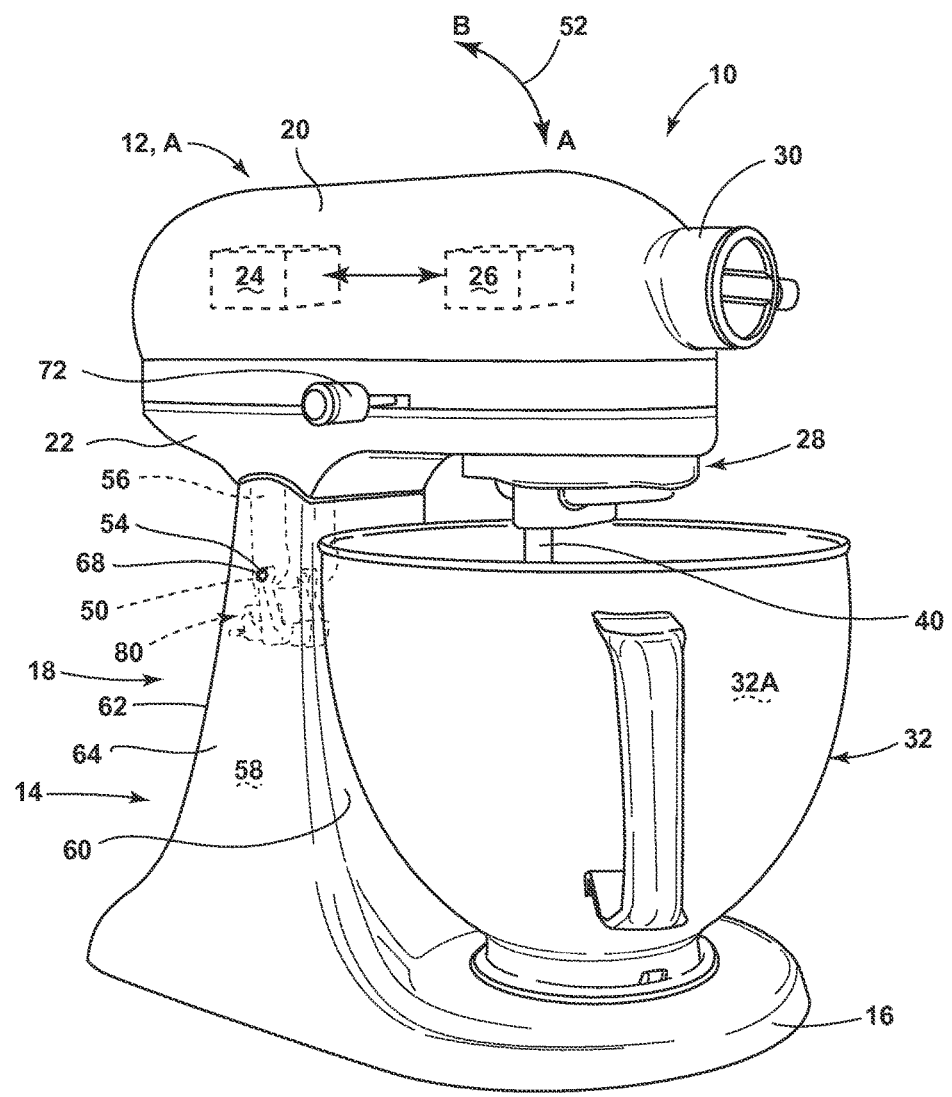
FIG. 1 is a front perspective view of a stand mixer having a damper mechanism coupled between a mixer head and a pedestal, wherein the mixer head is shown in a closed position.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations except for expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, reference numeral 10 generally designates a countertop stand mixer appliance 10 (hereinafter "stand mixer"). The stand mixer 10 of FIG. 1 generally includes an articulating mixer head 12 and an L-shaped pedestal 14, wherein the L-shaped pedestal 14 includes a base portion 16 and an upstanding support arm 18. The pedestal 14 is a weighted member, made from a cast metal material, such as die cast zinc, which supports the mixer head 12 in a pivoting manner as further described below. The mixer head 12 includes an upper housing 20 and a lower gearcase 22 which together encase a number of parts of the stand mixer 10, including, but not limited to a motor 24 and associated electronic motor controls 26. A primary drive assembly 28 and a secondary drive coupling hub 30, as wells as any number of gear assemblies and transmission components used to power the primary and secondary drives 28, 30 via the motor 24, are also supported from and pivot with the mixer head 12. The upper housing 20 and lower gearcase 22 are generally comprised of a cast metal material, such as die cast zinc, thereby making the mixer head 12, along with the internal parts thereof, a relatively heavy component of the stand mixer 10. An assembled mixer head, without attachments, can weigh approximately 5 to 7 pounds, and this weight is substantially increased as processing tools are coupled to the primary drive assembly 28 or accessories are coupled to and extend outwardly from the secondary drive coupling hub 30.

Figure 2:
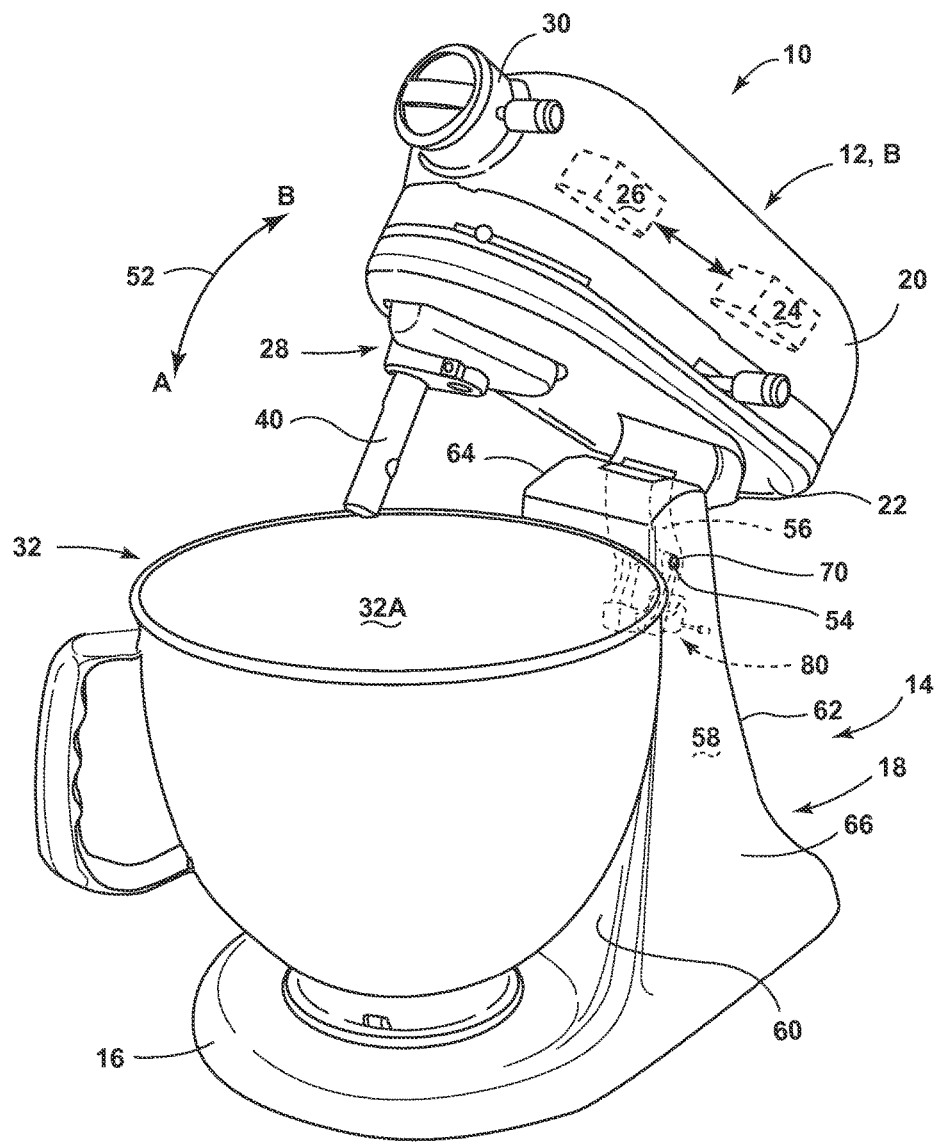
FIG. 2 is a front perspective view of the stand mixer of FIG. 1 showing the mixer head in an open position.
Figure 3:
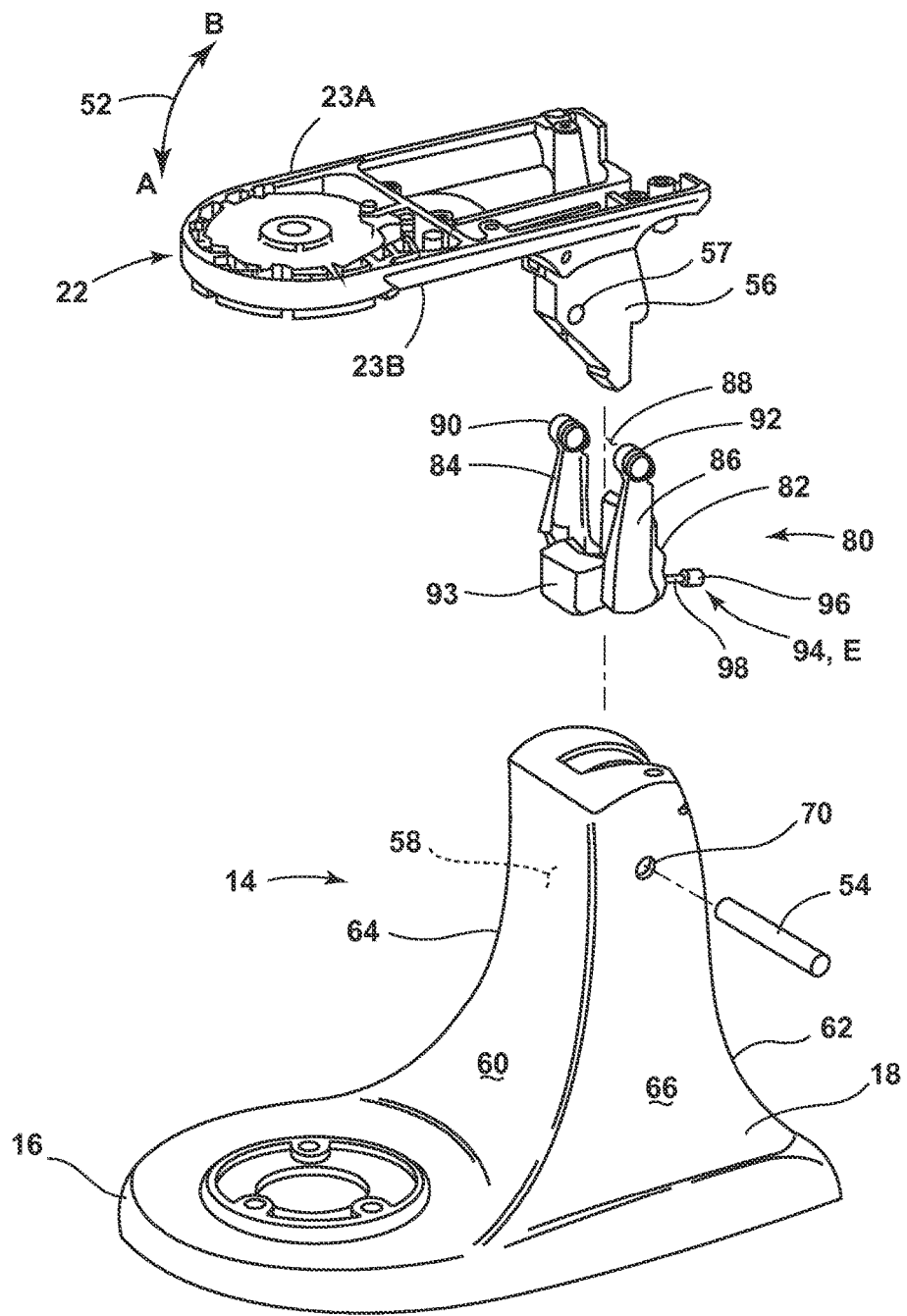
FIG. 3 is an exploded front perspective view of a lower gearcase, a damper mechanism, and a pedestal.

The base portion 16 of the pedestal 14 defines a landing for supporting a mixing vessel 32, shown in FIGS. 1 and 2 as a mixing bowl, and further includes an engagement feature 34 for locking the mixing vessel 32 in place on the stand mixer 10. The primary drive assembly 28 includes a drive shaft 40 used to process ingredients or contents of the mixing vessel 30 in a mixing procedure using any one of a variety of mixing tools adapted to couple to the drive shaft 40. The secondary drive coupling hub 30 is used for coupling and powering an accessory of the stand mixer 10. As noted above, both the primary drive assembly 28 and the secondary drive coupling hub 30 are powered by the motor 24 of the stand mixer 10. As shown in FIG. 1, the stand mixer 10 is a tilt-head stand mixer, such as the KSM154 Stand Mixer available from KitchenAid® of St. Joseph, Mich. Thus, the mixer head 12 is an articulating mixer head configured to pivot between an operational or closed position A (FIG. 1) and an open position B (FIG. 2) relative to the pedestal 14 at pivot point 50 along a path as indicated by arrow 52. As used throughout this disclosure, the stand mixer 10 or the mixer head 12 may be referred to as being in an open or closed position. In the embodiments shown in this disclosure, the stand mixer 10 is in the open position B, when the mixer head 12 is rotated upward as shown in FIG. 2. The stand mixer 10, in the disclosed embodiments, is in the closed position or operational position A, when the mixer head 12 is rotated downwards towards the mixing bowl 32, as shown in FIG. 1, and ready for a mixing procedure. As noted above, pivot point 50 coincides with a coupling of the pedestal 14 and mixer head 12 using a pivot pin 54. Specifically, the lower gearcase 22 includes a support stem 56 (FIG. 3) which extends downwardly from the lower gearcase 22 into a pedestal cavity 58 defined within the upstanding support arm 18 of the L-shaped pedestal 14. The upstanding support arm 18 includes a front wall 60, a rear wall 62, and opposing sidewalls 64, 66 (FIG. 2) which specifically define the pedestal cavity 58. As shown in FIG. 1, sidewall 64 includes a mounting aperture 68 which is configured to receive pivot pin 54 therethrough at pivot point 50. As best shown in FIG. 3, sidewall 66 also includes a mounting aperture 70 which is also configured to receive pivot pin 54 therethrough.

As further shown in FIG. 1, the stand mixer 10 includes a user control 72 which is illustratively embodied in FIG. 1 as a sliding speed control knob 72 mounted to a side of the mixer head 12. The user may choose a desired speed setting with the control knob 72, and the motor controls 26 will generally attempt to operate the motor 24 at the desired speed. It will be appreciated that in other embodiments the user control 72 may be any type of analog or digital user interface operable to input a desired speed setting for the stand mixer 10.

Referring now to FIG. 2, the mixer head 12 is shown in the open position B as pivoted from pivot point 50 relative to the upstanding pedestal 14 along the path as indicated by arrow 52. As shown in FIG. 2, with the mixer head 12 in the open position B, a receptacle portion 32A of the mixing bowl 32 is accessible for a user to introduce ingredients into the mixing bowl 32. Further, the drive shaft 40 of primary drive assembly 28 is also accessible for attaching or removing mixing tools thereto. As further shown in FIG. 2, the mixer head 12 includes a lock mechanism 80 disposed on an opposite side of the mixer head 12 relative to the speed control knob 52, shown in FIG. 1. The lock mechanism 80 is configured to lock the mixer head 12 in the operational position A, as shown in FIG. 1.

As noted above, the mixer head 12 is a relatively heavy component of the stand mixer 10, such that movement from the open position B (FIG. 2) to the closed position A (FIG. 1) can be sudden and jarring if not sufficiently controlled by a user. With reference to FIGS. 1 and 2, a damper mechanism 80 is shown disposed in the pedestal cavity 58. The damper mechanism 80 is coupled to the support stem 56 of the lower gearcase 22 and further coupled to the upstanding support arm 18 of pedestal 14 via pivot pin 54. As coupled to the pivot pin 54, the damper mechanism 80 is configured to dampen the downward movement or downward motion of the mixer head 12 from the open position B (FIG. 2) to the closed position A (FIG. 1) along a closure path indicated by arrow 52. The damper mechanism 80 may also be coupled between the mixer head 12 and the pedestal 14 in another manner, so long as the damper mechanism 80 is suitably positioned to dampen a portion of the downward movement of the mixer head 12 relative to the pedestal 14. The damper mechanism 80 is configured so that it does not interfere with the upward opening movement of the mixer head 12 from the closed position A (FIG. 1) to the open position B (FIG. 2) along path 52. Further, the damper mechanism 80 is configured to only impart a damping effect on a select portion of the downward movement of the mixer head 12, so as to limit the footprint of the damper mechanism 80 to the user, as further described below.

Referring now to FIG. 3, the lower gearcase 22 is shown exploded away from the pedestal 14 with the damper mechanism 80 shown exploded away from the pedestal cavity 58 of the pedestal 14. As shown in FIG. 3, the lower gearcase 22 includes an upper surface 23A and a lower surface 23B with the support stem 56 extending downwardly from the lower surface 23B. The support stem 56 includes a mounting aperture 57, through which the pivot pin 54 is received in assembly. In this way, the lower gearcase 22 pivots from the mounting aperture 57 of the support stem 56 via the pivot pin 54 in moving between the open and closed positions described above. As shown in FIG. 3, the damper mechanism 80 includes a swing body 82 having upwardly extending first and second arms 84, 86 which are spaced-apart to define a gap 88 in which the support stem 56 is received in assembly. The first and second swing arms 84, 86 are disposed on opposite sides of the swing body 82 and have upper pivot apertures 90, 92 which are configured to align with mounting aperture 57 of the support stem 56 in assembly. Thus, when the support stem 56 of the lower gearcase 22 is received within the gap 88 formed between the first and second swing arms 84, 86, the pivot apertures 90, 92 align with the mounting aperture 57 of the support stem 56 on opposite sides thereof, such that the pivot pin 54 is received therethrough. As described above, the pivot pin 54 is further received in the mounting apertures 68 (FIG. 1) and 70 of the upstanding support arm 18 of the pedestal 14. Thus, as assembled, the damper mechanism 80 is configured to pivot with the lower gearcase 22 as coupled to the support stem 56. The damper mechanism 80 further includes a piston damper 94 having a head portion 96 and a piston rod 98 which is slideably received in the swing body 82 between extended and compressed positions. In FIG. 3, the piston damper 94 is shown in the extended position E. The piston damper 94 is configured to abut an inner wall of the upstanding support arm 18 in use to dampen the movement of the lower gearcase 22, or mixer head 12, by compressing the piston damper 94. It is contemplated that the piston damper 94 is a biased member, such that the piston rod 98 and piston head 96 are biased outwardly towards the extended position E by hydraulic means, spring-biased means, or other biasing mechanism. For the purposes of this disclosure, the piston damper 94 will be described as a hydraulic piston damper providing a controlled damping of the lower gearcase 22 (or mixer head 12) towards the closed position A along the path as indicated by arrow 52. The swing body 82 further includes a bumper portion 93 disposed on an opposite side of the swing body 82 relative to the piston damper 94.

Figure 4:
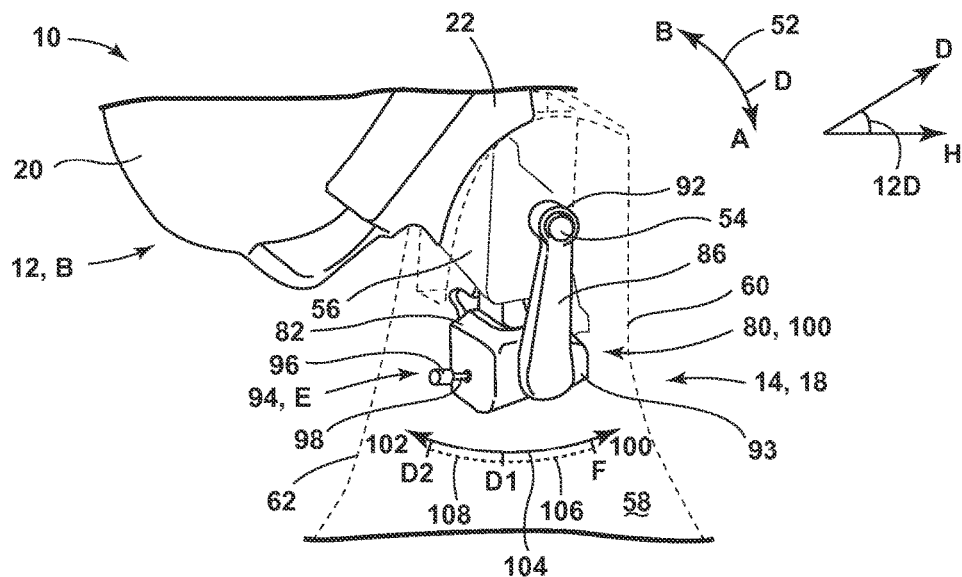
FIG. 4 is a fragmentary view of a mixer head in an open position and a pedestal shown in phantom to reveal a damper mechanism in a first position disposed therein.
Figure 7:
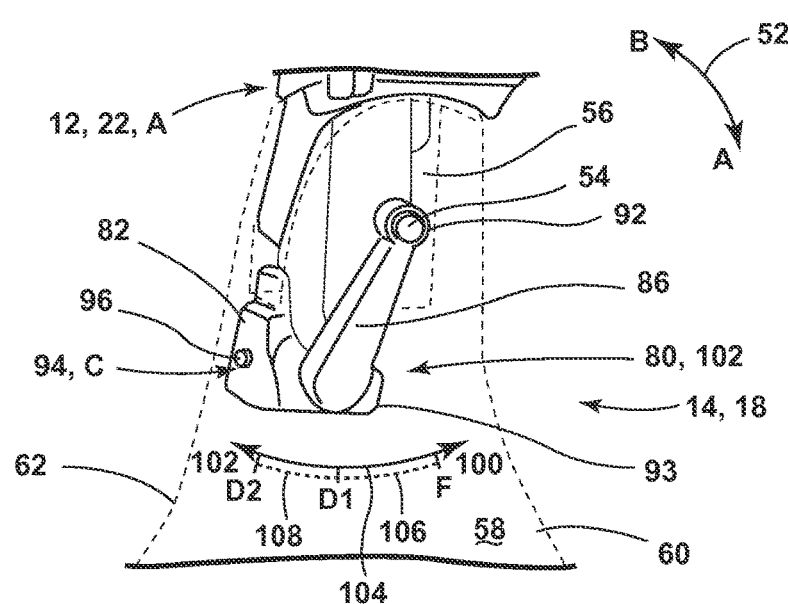
FIG. 7 is a fragmentary view of a mixer head in the closed position with the pedestal shown in phantom to reveal a damper mechanism in a second position.
Figure 8:
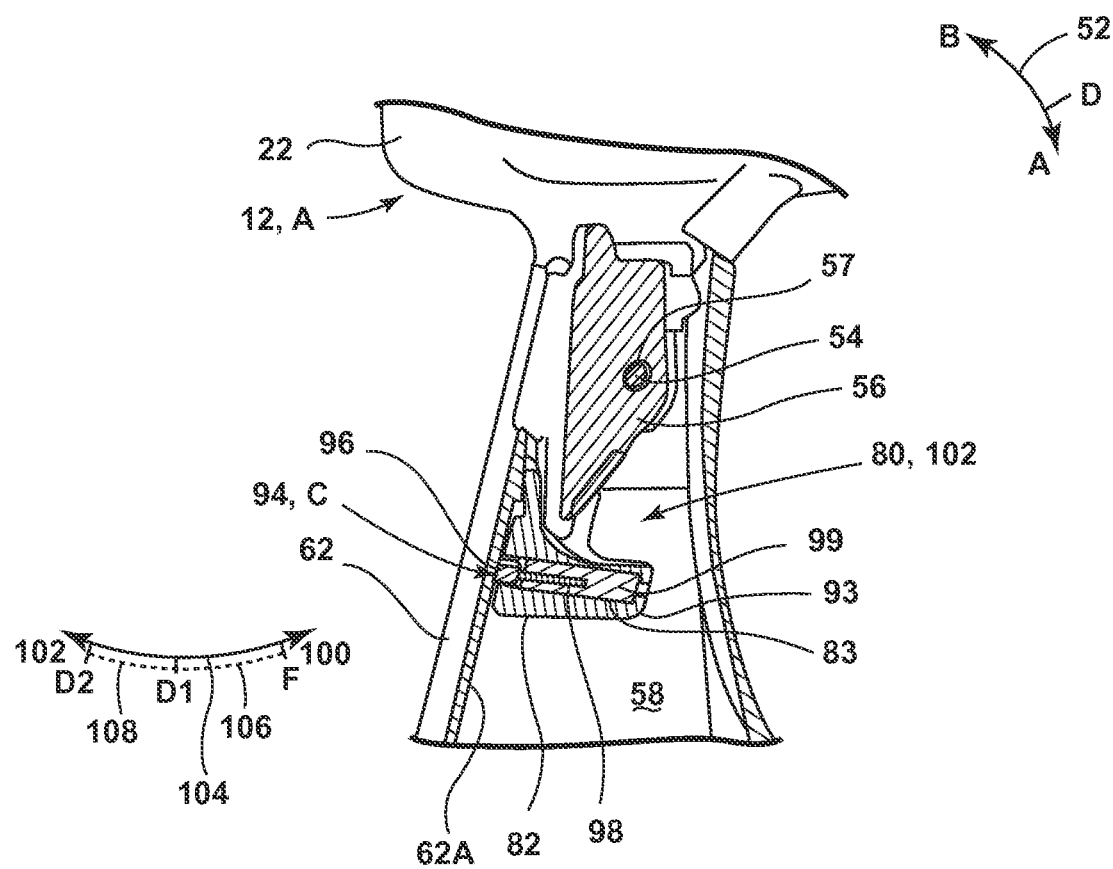
FIG. 8 is a cross-sectional view of the pedestal and damper mechanism of FIG. 7.

Referring now to FIG. 4, the damper mechanism 80 is shown disposed within the pedestal cavity 58 of the upstanding support arm 18 of the pedestal 14. The mixer head 12 is shown in the open position B which correlates to the damper mechanism 80 being in a first position 100. The damper mechanism 80 pivots with the mixer head 12 between the first position 100 and a second position 102 along an actuation path indicated by arrow 104. When the damper mechanism 80 is in the second position 102 along the actuation path 104, as shown in FIGS. 7 and 8, the damper mechanism 80 is considered to have dampened the movement of the mixer head 12 to the closed position A. The actuation path 104, which indicates the movement of the damper mechanism 80 between the first position 100 and second position 102, includes identifiers F, D1 and D2 along the length thereof. The identifiers F, D1 and D2 represent a condition of the damper mechanism 80 as the damper mechanism 80 moves along the actuation path 104. Thus, it is contemplated that with the damper mechanism 80 in the first position 100, which corresponds to an open position B of the mixer head 12, the damper mechanism 80 is also at position F on the actuation path 104. From position F to position D1, the damper mechanism 80 moves freely within the pedestal cavity 58 along a first portion 106 of actuation path 104. At position D1, it is contemplated that the piston head 96 has abutted an inner wall of the upstanding arm 81 of the pedestal cavity 58, such that position D1 indicates the initiation of a damping of the movement of the mixer head 12 moving from the open position B towards the closed position A along the path as indicated by arrow 52. At position D2, the damper mechanism 80 is considered to be in the second position 102 which corresponds to the mixer head 12 being in the closed position A, as shown in FIG. 1. Thus, it is contemplated that the damper mechanism 80 dampens between positions D1 and D2 along actuation path 104 to define a second portion 108 of the actuation path 104. Thus, it is contemplated that the mixer head 12 moves freely from the open position B towards the closed position A during the first portion 106 of the movement of the damper mechanism 80 along actuation path 104, until the damper mechanism 80 gets to position D1 along the actuation path 104, wherein the damping of the movement of the mixer head 12 begins. It is contemplated that when the damping of the movement of the mixer head 12 occurs at position D1 along the actuation path 104, the mixer head 12 may be in an angled position D along the path indicated by arrow 52, wherein the position D is at an angle 12D from horizontal H. When the mixer head 12 is in the angled position D, wherein damping by the damper mechanism 80 is initiated, it is contemplated that the mixer head 12 will be disposed at an angle 12D which is preferably in the range of about 10 degrees to about 20 degrees from horizontal H. More preferably, the angle 12D corresponds to the mixer head 12 being disposed at 12 degrees from horizontal H. In this way, the damper mechanism 80 allows for free movement of the mixer head 12 along the first portion 106 of the actuation path 104 until the mixer head 12 reaches angled position D along its opening and closing path indicated by arrow 52, wherein damping by the damper mechanism 80 is initiated and sustained from position D1 to D2 along the actuation path 104, also identified as second portion 108 of the actuation path 104. Therefore, it is contemplated that the user can move the mixer head 12 towards the closed position A from the open position B, wherein the mixer head 12 will slow its movement beginning at angled position D in a slow and controlled manner provided by the soft-close damping effect of the damper mechanism 80.

Figure 5:
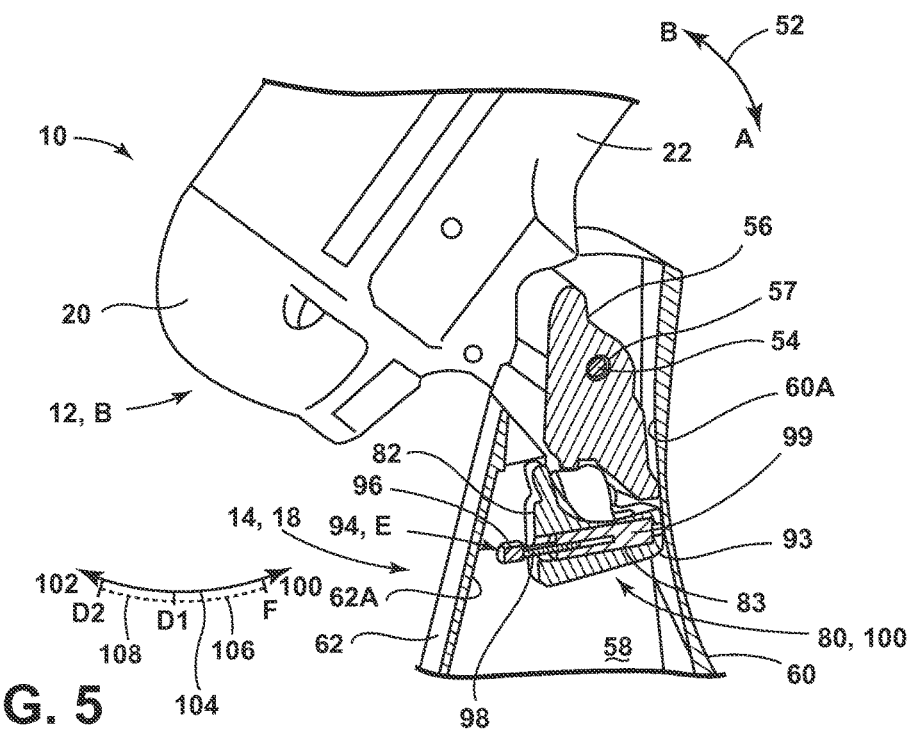
FIG. 5 is a cross-sectional view of the pedestal and damper mechanism of FIG. 4.

Referring now to FIG. 5, the mixer head 12 is shown in the open position B and the upstanding support arm 18 of the pedestal 14 is shown in a cross-sectional view with the damper mechanism 80 and the support stem 56 of the lower gearcase 22 also shown in a cross-sectional view. With regards to the support stem 56, pivot pin 54 is shown received in mounting aperture 57 thereof. The damper mechanism 80 is shown in the first position 100 and the bumper portion 93 of the swing body 82 is shown in an abutting position against an inner surface 60A of front wall 60 of the upstanding support arm 18. Thus, when the damper mechanism 80 is in the first position 100, which corresponds to an open position B of the mixer head 12, the bumper portion 93 of the damper mechanism 80 will be in contact with the inner surface 60A of front wall 60 of the upstanding support arm 18 within the pedestal cavity 58. It is contemplated that the bumper portion 93 can itself be a resilient member, or have a resilient member affixed thereto, such that the contact between the damper mechanism 80 and the inner surface 60A of front wall 60 at bumper portion 93 is silent or otherwise negligible. As further shown in FIG. 5, the damper mechanism 80 includes a receiving cavity 83 in which a damper housing 99 is received. The damper housing 99 is contemplated to contain a biasing means, such as hydraulic fluid, and receives the piston rod 98 as the piston damper 94 moves from the extended position E to the compressed position C.

Figure 6:
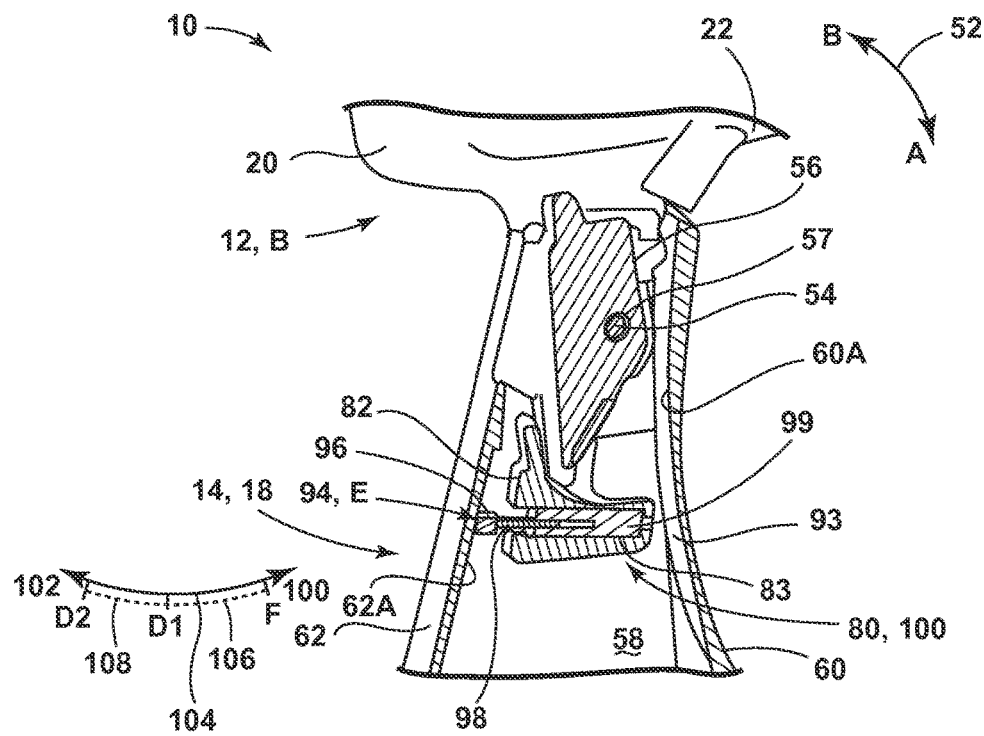
FIG. 6 is a cross-sectional view of the damper mechanism of FIG. 5 with the mixer head being moved towards the closed position.

Referring now to FIG. 6, the damper mechanism 80 is shown at position D1 along actuation path 104, wherein the piston damper 94 has made contact with an inner surface 62A of rear wall 62 of upstanding support arm 18 of pedestal 14. The initial contact is shown as an abutting contact between the piston head 96 and the inner surface 62A of rear wall 62. It is at this position, D1, where the damper mechanism 80 begins to dampen the downward movement of the mixer head 12 towards the closed position A along the path as indicated by arrow 52. Thus, the mixer head 12 is shown in position D along the path 52 where, as noted above, the damping effect of the damper mechanism 80 is initiated. From this position D, the movement of the mixer head 12 will be damped as the piston rod 98 is received in the damper housing 99 in a controlled manner as the piston damper 94 moves to the compressed position C. As shown in FIG. 6, it is contemplated that the mixer head 12 is disposed at an angle 12D which, as noted above, is within a range of 10-20 degrees from horizontal, and more preferably, 12 degrees.

Referring now to FIGS. 7 and 8, the damper mechanism 80 is shown in the second position 102, such that the damper mechanism is at position D1 along the actuation path 104. Thus, from FIG. 6 to FIGS. 7 and 8, the damper mechanism 80 moved along the second portion 108 of the actuation path 104 to dampen the downward movement of the mixer head 12 towards the closed position A. Thus, in FIGS. 7 and 8, the piston damper 94 is shown in the compressed position C, wherein the piston rod 98 is fully received within the damper housing 99. Thus, it is contemplated that the mixer head 12 was brought from position D (FIG. 6) to position A (FIGS. 7 and 8) in a slow and controlled manner, even with the relatively heavy nature of the mixer head 12.

Referring now to FIG. 9, the piston damper 94 is again shown having the piston rod 98 and piston head 96 in the extended position E to which these parts are biased by biasing means, such as hydraulic fluid, contained within the damper housing 99 in a manner known in the art. The piston damper 94 is configured to compress as the piston head 96 abuts the inner surface 62A of rear wall 62 during the movement of the mixer head 12 and damper mechanism 80, as described above. In this way, the piston rod 98 moves between the extended position E and compressed position C, wherein the piston rod 98 is substantially received within the damper housing 99 in the compressed position C. Movement between the extended position E and the compressed position C is shown along the path indicated by arrow 97 in FIG. 9, such that the piston rod 98 is axially movable within the damper housing 99. It is contemplated that the damping effect of the piston damper 94 can be controlled by tuning the damping means of the damper mechanism 80, such as by using different hydraulic means of varying viscosity. It is also contemplated that the damping means used in conjunction with the present disclosure ensures that the mixer head 12 will move to the fully closed position A without any spring back or rebound effect from the damper mechanism 80, and further that the mixer head 12 will remain in the fully closed position, such that the piston damper 94 does not have enough power to overcome the weight of the mixer head 12 while still being biased toward the extended position E. Thus, the piston rod 98 and piston head 96 will only move to the extended position E, as biased thereto, when a user moves the mixer head 12 towards the open position B.

Referring now to FIGS. 10 and 11, another embodiment of a damper mechanism is shown, wherein a swing body 110 is shown in FIG. 10 and a bumper assembly 112 is shown in FIG. 11. With specific reference to FIG. 10, the swing body 110 includes a lower portion 114 having a generally centrally disposed receiving channel 116 for receiving a damper mechanism, such as damper mechanism 94 as described above with reference to FIG. 9. The swing body 110 further includes an upper portion 118 having first and second retainers 120, 122 which are configured in a spaced-apart relationship to define a gap 124 therebetween. The retainers 120, 122 are configured to receive a pivot pin, such as pivot pin 54 (best shown in FIG. 3). In this way, the swing body 110 can couple to the pedestal and mixer head, such as pedestal 14 and mixer head 12 described above, at pivot point 50, shown in FIG. 1. It is contemplated that a portion of the pedestal stem 56 (FIG. 3) can be received in the gap 124 formed between the first and second retainers 120, 122 which are configured to receive pivot pin 54. With specific reference to FIG. 11, the bumper assembly 112 is contemplated to be received or otherwise coupled to the swing body 110 (FIG. 10) to accommodate for the abutting configuration of the bumper assembly 112 with an inner surface, such as inner surface 60A, of front wall 60 of pedestal 14 when the mixer head 12 is in the open position B. The bumper assembly 112 includes a main body 126 and an outwardly extending bumper 128 having a substantially planar abutment portion 130 disposed on an end thereof.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

What is claimed is:

1. A damper mechanism for a stand mixer, the stand mixer having a mixer head and a pedestal, wherein the mixer head is pivotally coupled to the pedestal via a pivot pin between open and closed positions relative to the pedestal, the damper mechanism comprising:
    a swing body coupled to the pivot pin and operable along an actuation path between first and second positions, wherein the swing body includes a receiving channel disposed on a first side of the swing body and at least one upwardly extending arm having an aperture disposed at an upper portion of the arm;
    a bumper positioned on a second side of the swing body, wherein the second side of the swing body is in an opposed position relative to the first side of the swing body; and
    a piston damper having a damper housing and a piston rod, wherein the piston damper is received within the receiving channel of the swing body, and further wherein the piston rod is operable between extended and compressed positions relative to the damper housing and extends outwardly from the first side of the swing body; and further wherein the piston damper provides a damping effect along a portion of the actuation path of the swing body as the mixer head moves towards the closed position.

2. The damper mechanism of claim 1, wherein the actuation path of the swing body includes a first portion and a second portion.

3. The damper mechanism of claim 2, wherein the downward movement of the mixer head is not dampened during the first portion of the actuation path of the swing body.

4. The damper mechanism of claim 3, wherein the downward movement of the mixer head is dampened during the second portion of the actuation path of the swing body.

5. The damper mechanism of claim 4, wherein the at least one arm includes first and second arms extending outwardly from the swing body and coupled to the pivot pin.

6. The damper mechanism of claim 5, wherein the first and second arms are spaced-apart from on another and disposed on third and fourth opposed sides of the swing body.

7. The damper mechanism of claim 2, wherein the dampening effect of the piston damper begins when the mixer head is at an angled position and the swing body is in the second portion of the actuation path.

8. The damper mechanism of claim 7, wherein the angled position of the mixer head includes an angle of the mixer head relative to the pedestal in a range from about 10 degrees to about 20 degrees.

9. The damper mechanism of claim 8, wherein the angled position of the mixer head includes an angle of the mixer head relative to the pedestal of about 12 degrees.

10. A stand mixer damper mechanism comprising a swing body having front and rear sides and a receiving channel disposed in the swing body and opening at the rear side thereof;
    a bumper positioned on the front side of the swing body; and
    a piston damper received in the receiving channel of the swing body, the piston damper including a piston rod that is operable between extended and compressed positions, wherein the piston rod is biased towards the extended position by a biasing mechanism.

11. The damper mechanism of claim 10, including:
    first and second arms upwardly extending from the swing body.

12. The damper mechanism of claim 11, wherein each of the first and second arms are disposed on opposite side portions of the swing body.

13. The damper mechanism of claim 12, wherein the piston damper is a hydraulic damper, and further wherein the piston rod is axially movable between the extended and compressed positions.

14. The damper mechanism of claim 13, wherein the first and second arms each include apertures disposed at upper portions thereof.

* * * * *